United States Patent
Cowley et al.

(10) Patent No.: US 12,289,556 B2
(45) Date of Patent: Apr. 29, 2025

(54) PIXEL ARRAY READOUT CIRCUITRY

(71) Applicant: SEMICONDUCTOR COMPONENTS INDUSTRIES, LLC, Scottsdale, AZ (US)

(72) Inventors: Nicholas Paul Cowley, Wroughton (GB); Senthil Velan, Chennai (IN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 83 days.

(21) Appl. No.: 18/300,027

(22) Filed: Apr. 13, 2023

(65) Prior Publication Data

US 2024/0348949 A1 Oct. 17, 2024

(51) Int. Cl.
*H04N 25/78* (2023.01)
*H04N 25/703* (2023.01)

(52) U.S. Cl.
CPC .......... *H04N 25/78* (2023.01); *H04N 25/703* (2023.01)

(58) Field of Classification Search
CPC .... H04N 25/616; H04N 25/63; H04N 25/633; H04N 25/65; H04N 25/75; H04N 25/78
See application file for complete search history.

(56) References Cited

U.S. PATENT DOCUMENTS

| | | | |
|---|---|---|---|
| 2004/0252214 A1 | 12/2004 | Ahn | |
| 2007/0188641 A1* | 8/2007 | Jang | ..................... H04N 25/627 348/308 |
| 2019/0313042 A1 | 10/2019 | Janbu et al. | |

FOREIGN PATENT DOCUMENTS

| | | | |
|---|---|---|---|
| JP | 2017139585 A | * | 8/2017 |
| WO | 2013148833 A1 | | 10/2013 |

OTHER PUBLICATIONS

Machine Translation of JP2017-139585 (Year: 2017).*
M. Klosowski et al., "A CMOS Pixel With Embedded ADC, Digital CDS and Gain Correction Capability for Massively Parallel Imaging Array", IEEE, vol. 64, No. 1, Jan. 2017.
Suho Son et al., "A One-Shot Digital Correlated Double Sampling with a Differential Difference Amplifier for a High Speed CMOS Image Sensor", IEEE, 2015, p. 1054-1057.

* cited by examiner

*Primary Examiner* — Daniel M Pasiewicz
(74) *Attorney, Agent, or Firm* — Treyz Law Group, P.C.; Tianyi He (57) ABSTRACT

An image sensor may include an image sensor pixel array. The image sensor pixel array may include active image sensor pixels and non-active image sensor pixels. A line of image sensor pixels may be coupled to readout circuitry. The readout circuitry may use reset level signals from some of the image sensor pixels to obtain a digital average reset level value and may use the digital average reset level value to perform digital-domain correlated double sampling operations for digital image level values from active image sensor pixels in the line of image sensor pixels.

20 Claims, 4 Drawing Sheets

PIXEL ARRAY READOUT CIRCUITRY

BACKGROUND

This relates generally to imaging systems, and more specifically, to image sensors in imaging systems.

Image sensors are commonly used in electronic systems or devices to generate image data. In a typical arrangement, an image sensor includes an array of active image sensor pixels. Based on control signals received along control paths, the active image sensor pixels generate image signals in response to incident light. The generated image signals are read out along readout paths and are used to generate one or more image frames usable in the electronic system.

The image sensor can generate these image frames at a corresponding frame rate. The frame rate can be at least in part determined by analog-to-digital conversion operations. Accordingly, it may be desirable to more efficiently perform the analog-to-digital conversion operations to improve, or specifically increase, the frame rate.

DETAILED DESCRIPTION

Electronic systems and/or devices may include one or more image sensors that gather incoming light to capture images. The image sensor may include one or more arrays of image sensor pixels. The pixels in the image sensor may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
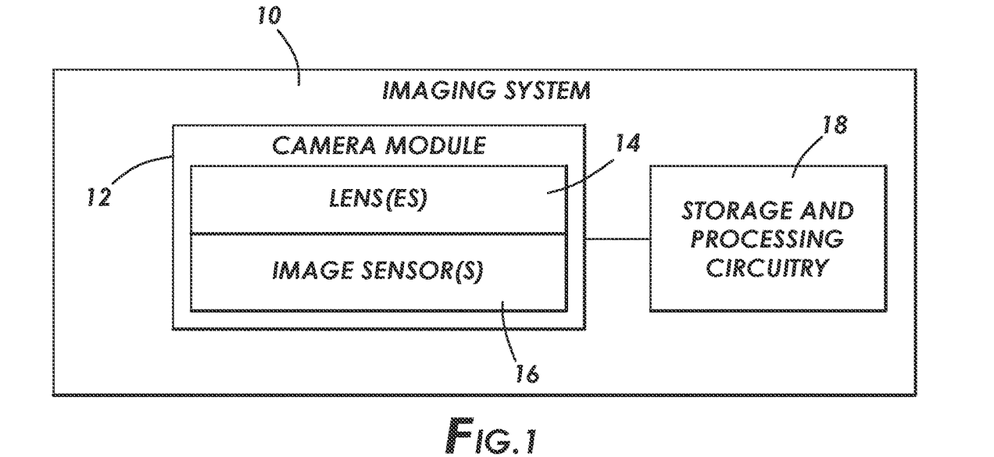
FIG. 1 is a diagram of an illustrative system having one or more image sensors in accordance with some embodiments.

FIG. 1 is a functional block diagram of an illustrative imaging system such as an electronic device that uses an image sensor to capture images. Imaging system 10 of FIG. 1 may be a portable electronic device such as a camera, a cellular telephone, a tablet computer, a webcam, a video camera, a video surveillance system, an automotive imaging system, a video gaming system with imaging capabilities, an augmented reality and/or virtual reality system, an unmanned aerial vehicle system such as a drone, an industrial system, or any other desired imaging system or device that captures image data.

Camera module 12, sometimes referred to as an imaging module, may be used to convert incoming light into digital image data. Camera module 12 may include one or more lenses 14 and one or more image sensors 16. When capturing images, light from a scene may be focused onto each image sensor 16 by one or more lenses 14. Image sensor 16 may include circuitry for converting analog pixel image signals into corresponding digital image data that is provided to storage and processing circuitry 18.

Storage and processing circuitry 18 may include one or more integrated circuits, each serving data storage functions and/or data computation or processing functions. In some examples, the one or more integrated circuits may include image processing circuits such as digital signal processors, application-specific integrated circuits, general-purpose processors, microprocessors, microcontrollers, storage devices such as random-access memory and non-volatile memory, and/or other types of integrated circuits having processors and/or memories.

Storage and processing circuitry 18 may be implemented using components that are separate from the camera module and/or components that form part of the camera module. As one example, storage and processing circuitry 18 may be implemented using circuits that form part of an integrated circuit that includes an image sensor 16 or an integrated circuit within camera module 12. When storage and processing circuitry 18 is included on different integrated circuits than those of image sensors 16, the integrated circuits with storage and processing circuitry 18 may be vertically stacked or packaged with respect to the integrated circuits with image sensors 16.

Image data that has been captured by camera module 12 may be processed and stored using processing circuitry 18. In some examples, an image processing engine on processing circuitry 18, an imaging mode selection engine on processing circuitry 18, and/or other types of processing engines on processing circuitry 18 may process the image data captured by camera module 12. Processing circuitry 18 may, if desired, provide processed image data to external equipment such as a computer, an external display, or other devices using wired and/or wireless communication paths.

Figure 2:
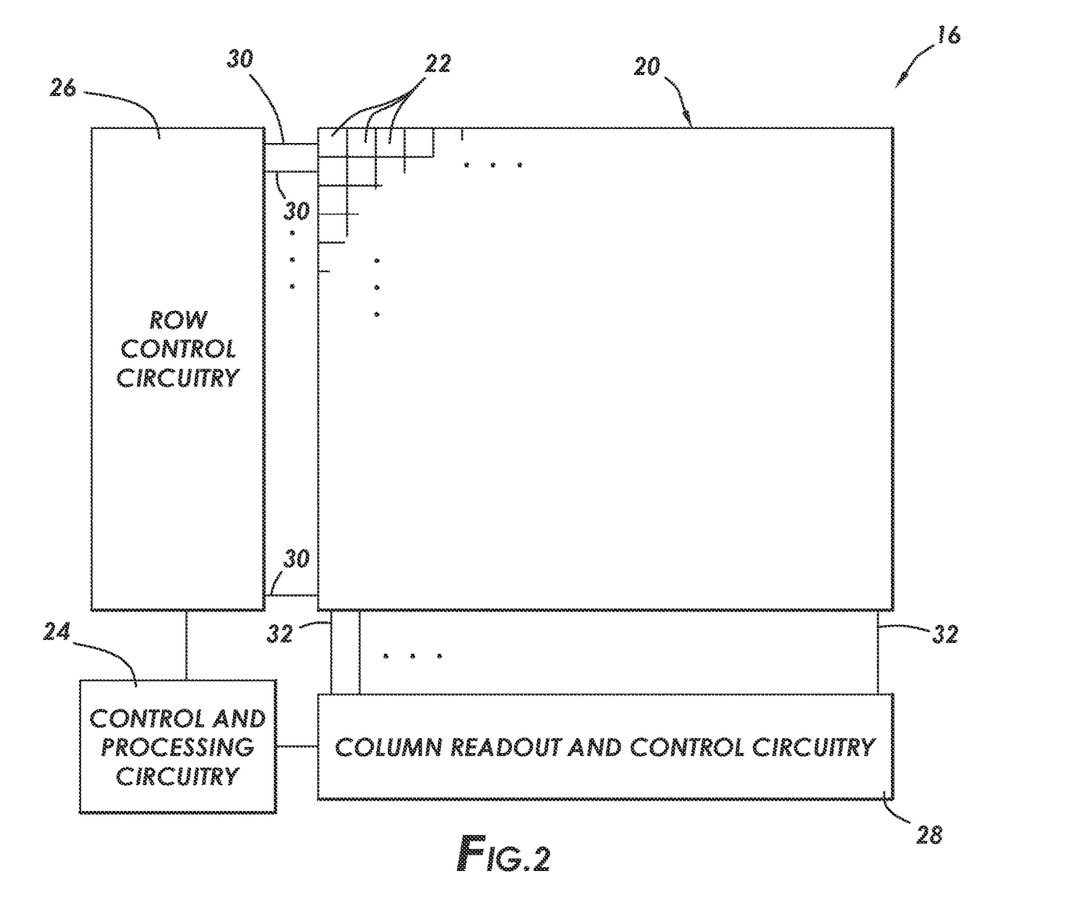
FIG. 2 is a diagram of illustrative image sensor circuitry having an image sensor pixel array and control and readout circuitry for the pixel array in accordance with some embodiments.

As shown in FIG. 2, image sensor 16 may include a pixel array such as pixel array 20 containing image sensor pixels 22, which are sometimes referred to herein as image pixels or pixels, arranged in rows and columns. A row of pixels or a column of pixels may sometimes be referred to herein generally as a line of pixels. Image sensor 16 may include control and processing circuitry 24, sometimes referred to herein as control circuitry 24, that controls the operation of pixel array 20. Pixel array 20 may contain, for example, hundreds or thousands of rows and columns of image sensor pixels 22. Control circuitry 24 may be coupled to pixel control circuitry such as row control circuitry 26 which includes row drivers that provide control signals to pixel array 20 and may be coupled to pixel readout circuitry such as column readout and control circuitry 28 that read out signals from pixel array 20.

Row control circuitry 26 may receive row addresses and/or signals indicative of row addresses from control circuitry 24 and supply corresponding row control signals such as reset, anti-blooming, row-select, charge transfer, dual conversion gain, and readout control signals to pixels 22 over conductive lines or paths 30 such as pixel row control paths. In particular, each pixel row may receive different control signals over a corresponding number of control paths such that each pixel row is coupled to multiple conductive paths 30. One or more conductive lines or paths 32 such as pixel column readout paths may be coupled to each column of pixels 22. Conductive paths 32 may be used for reading out image signals from pixels 22 and for supplying bias signals such as bias currents or bias voltages to pixels 22. As an example, when performing a pixel readout operation, a pixel row in pixel array 20 may be selected using row control circuitry 26 and image signals generated by the selected image pixels 22 in that pixel row can be read out along conductive paths 32.

Column readout circuitry 28 may receive image signals such as analog pixel values generated by pixels 22 over conductive paths 32. Column readout circuitry 28 may include memory or buffer circuitry for temporarily storing calibration signals such as reset level signals, reference level signals, and/or other non-image signals read out from array 20 and for temporarily storing image level signals read out from array 20, amplifier circuitry or a multiplier circuit, analog to digital conversion (ADC) circuitry, bias circuitry, latch circuitry for selectively enabling or disabling portions of column readout circuitry 28, or other circuitry that is coupled to one or more columns of pixels in array 20 for operating pixels 22 and/or for reading out image signals from pixels 22. ADC circuitry in readout circuitry 28 may convert analog pixel values received from array 20 into corresponding digital pixel values, sometimes referred to as digital image data or digital pixel data. Column readout circuitry 28 may supply digital pixel data from pixels 22 in one or more pixel columns to control and processing circuitry 24 and/or processor 18 (FIG. 1) for further processing and/or storage.

If desired, pixel array 20 may be provided with a filter array having multiple visible color or non-visible filter elements each corresponding to a respective pixel, thereby allowing a single image sensor to sample light of different colors or sets of wavelengths.

Image sensor pixels 22 may be formed in a semiconductor substrate using complementary metal-oxide-semiconductor (CMOS) technology or charge-coupled device (CCD) technology or any other suitable photosensitive device technology. Image sensor pixels 22 may be frontside illumination (FSI) image sensor pixels or backside illumination (BSI) image sensor pixels. If desired, image sensor 16 may be implemented using an integrated circuit package or other structure in which multiple integrated circuit dies or chips are vertically stacked with respect to each other.

Figure 3:
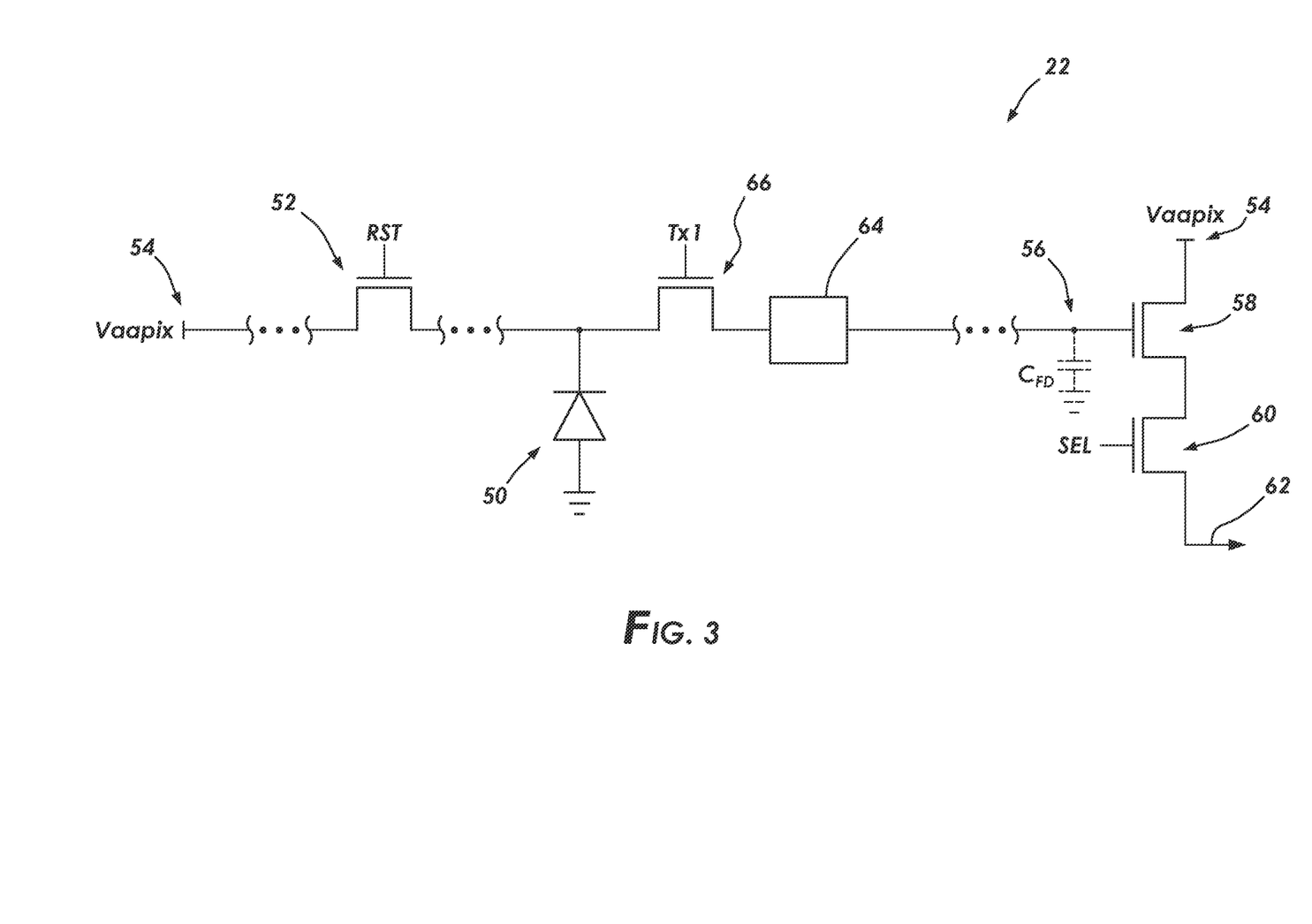
FIG. 3 is a diagram of an illustrative image sensor pixel in accordance with some embodiments.

FIG. 3 shows an illustrative image sensor pixel such as pixel 22 which can be used to implement pixels 22 across array 20 in FIG. 2. As shown in FIG. 3, pixel 22 includes a photosensitive element such as photodiode 50 that receives incident light over a period of time, sometimes referred to as an integration time period, and generates electric charge based on the incident light. Pixel 22 may include a transistor such as reset transistor 52 that couples photodiode 50 to a voltage source such as voltage terminal 54 supplying a pixel supply voltage, sometimes referred to as a reset level voltage. In particular, the coupling between photodiode 50 and voltage terminal 54 using transistor 52 may be direct (without any other intervening transistors or other adjustable elements) or indirect (with one or more additional transistors between photodiode 50 and voltage terminal 54). Transistor 52 may be activated by asserting control signal RST to connect photodiode 50 to voltage terminal 54 to reset photodiode 50 to a reset level voltage. Any additional transistors may also be activated by asserting corresponding control signals at a same time as the transistor 52 is activated.

As shown in FIG. 3, pixel 22 includes a floating diffusion region 56 having an associated charge storage capacity (indicated by capacitance CFD). One or more charge transfer transistors such as transistor 66 may couple photodiode 50 to floating diffusion region 56. One or more of these transfer transistors 66 may be activated to transfer photodiode-generated charge to floating diffusion region 56 for pixel readout operations such as for reading out image level signals corresponding to the transferred charge at floating diffusion region 56 from pixel 22. If desired, a reset transistor, such as reset transistor 52 or another reset transistor, may couple and connect floating diffusion region 56 to a voltage terminal supplying a pixel supply voltage to reset floating diffusion region 56 to a reset level voltage such as the pixel supply voltage. The reset level charge at floating diffusion region 56 may be read out as reset level signals.

To enable the pixel readout operations, pixel 22 may include a source follower transistor 58 and a row select transistor 60. Source follower transistor 58 may have a gate terminal coupled to floating diffusion region 56, a first source-drain terminal (e.g., one of a source or drain terminal) coupled to a voltage source such as voltage terminal 54 supplying a pixel supply voltage, and a second source-drain terminal (e.g., the other one of the source or drain terminal) coupled to row select transistor 60. When control signal SEL for row select transistor 60 is asserted, a pixel output signal may be passed onto pixel output path 62. For example, control signal SEL may be asserted during a pixel row readout operation when reset and/or image level signals from pixels in a given row that includes pixel 22 are being read out. Pixel output path 62 may be coupled to column line 32 in FIG. 2. The pixel output signal may be an output signal having a magnitude that is proportional to the amount of charge at floating diffusion region 56. In some examples, the output signal may represent a reset level signal when the amount of charge at floating diffusion region 56 is associated with reset level charge or may represent an image level signal when the amount of charge at floating diffusion region 56 is associated with image level or photodiode-generated charge.

If desired, pixel 22 may include one or more local charge storage regions (sometimes referred to as charge storage structures) such as storage gates, capacitors, and/or other charge storage circuits coupled between photodiode 50 and floating diffusion region 56. In some examples, these charge storage circuits may be coupled in series and/or in one or more corresponding parallel paths between photodiode 50 and floating diffusion region 56. If desired, pixel 22 may include one or more conversion gain devices, such as one or more conversion gain capacitors or other charge storage circuits, coupled to floating diffusion region 56 via corresponding intervening transistors.

In the example of FIG. 3, pixel 22 includes local charge storage region 64 coupled between photodiode 50 and floating diffusion region 56. Charge storage region 64 may be a storage gate, a storage diode, or any other suitable charge storage structure. Transistor 66 may couple photodiode 50 to charge storage region 64. When control signal TX1 is asserted to activate transistor 66, photodiode-generated charge may be transferred from photodiode 50 to charge storage region 64 prior to being transferred to floating diffusion region 56 for a readout operation. If desired, charge storage region 64 may be omitted. While not explicitly shown in FIG. 3 in order to not obscure the present embodiments, one or more additional elements such as transistors may couple and be activated to connect charge storage region 64 to floating diffusion region 56.

The configuration of pixel 22 in FIG. 3 is merely illustrative. If desired, pixel 22 may include any additional elements such as transistors, photosensitive elements, and (conversion gain) capacitors in addition to or instead of the elements in pixel 22 of FIG. 3.

As described in connection with FIG. 3, each pixel 22, or more specifically each active pixel 22, may output a reset level signal and an image level signal. Readout circuitry such as circuitry 28 in FIG. 2 may use these two signals to perform correlated double sampling (CDS) operation(s). As an example, the CDS operations may include a correlated double sampling based on the analog versions of these signals and/or a correlated double sampling based on the digital values of these signals. However, performing the correlated double sampling using the digital values of both the image level signal and the reset level signal for each pixel 22, or generally for each row of pixels during a readout operation, can require digitization of each pixel-specific reset level signal, which can consume excess time and undesirably reduce the frame rate. It may be desirable to improve the frame rate while providing satisfactory noise characteristics for the output image data. This improvement may, for example, be achieved while still performing digital-domain correlated double sampling for the digital value of the image level signal.

Figure 4:
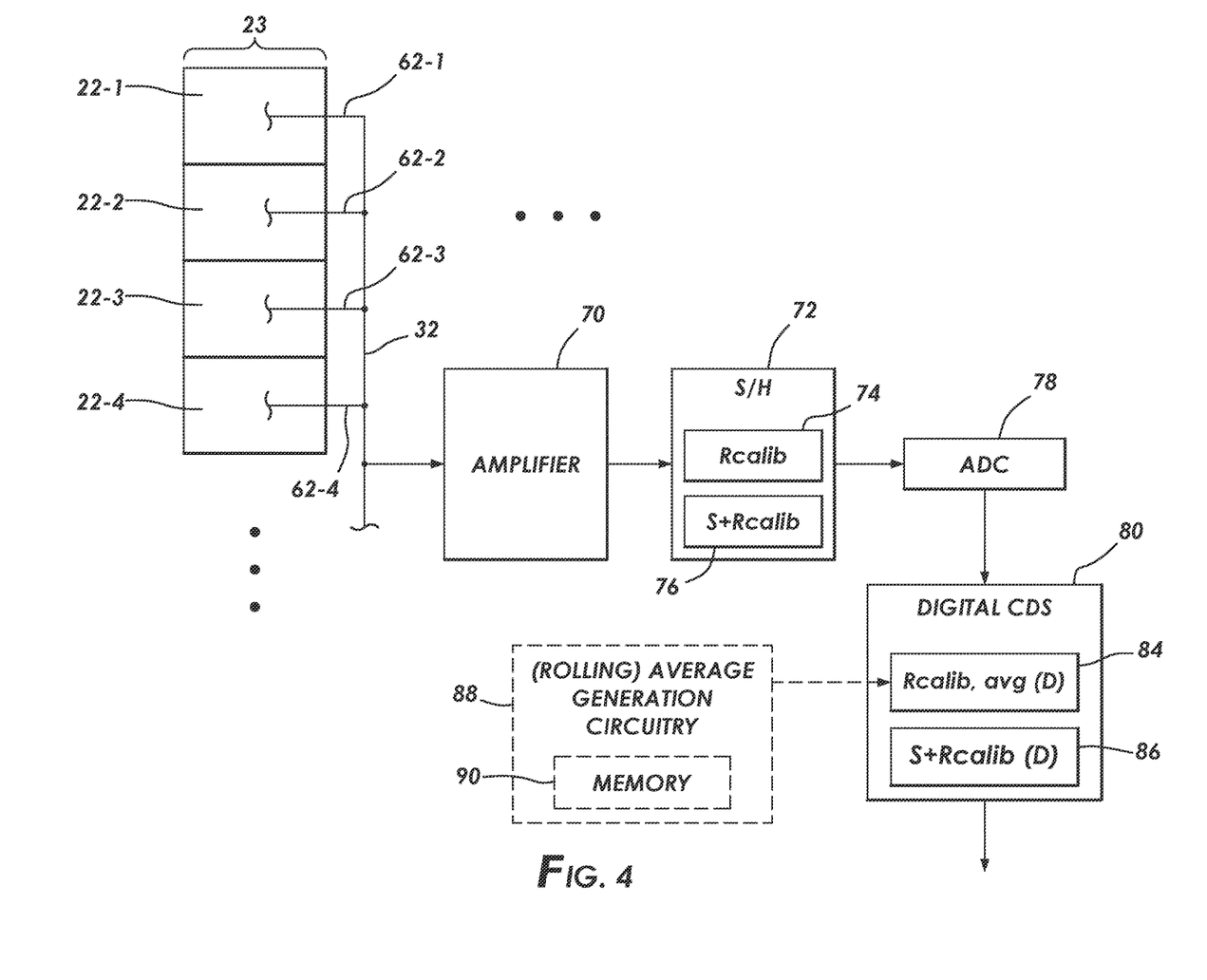
FIG. 4 is a diagram of illustrative readout circuitry coupled to a line of pixels in accordance with some embodiments.

FIG. 4 is a diagram of illustrative pixel array readout circuitry that can reduce the number of analog-to digital conversions per pixel readout while still outputting satisfactory image data resulting from digital-domain correlated double sampling.

In particular, FIG. 4 shows an illustrative portion of pixel array 20 in FIG. 2 such as a set or line 23 of pixels 22. In configurations described herein as an illustrative example, pixel set 23 may correspond to a pixel column. Pixel set 23 such as a pixel column may include any suitable number of pixels 22 such as pixels 22-1, 22-2, 22-3, and 22-4 in the example of FIG. 4.

Each pixel 22 in set 23 may have a corresponding pixel output path 62 that is coupled to a shared output path such as column line 32 (FIG. 2).

Output path 32 may couple each pixel 22 in pixel set 23 to shared readout circuitry. As an example, the shared readout circuitry may be a per-column portion of readout circuitry 28 in FIG. 2. Each set or column of pixels 22 may be coupled to a corresponding per-column shared portion of readout circuitry. For example, the corresponding per-column shared portion of readout circuitry may be of the type described in connection with FIG. 4. In configurations in which pixel 23 represents a column of pixels, the portion of readout circuitry shown in FIG. 4 may be referred to as per-column readout circuitry or per-column readout circuit, or more generally as column readout circuitry or column readout circuit.

The per-column readout circuitry may include amplifier circuit 70 or simply amplifier 70, sample-and-hold circuitry 72 or generally analog memory circuitry, analog-to-digital conversion circuitry 78 or simply analog-to-digital converter, digital(-domain) correlated double sampling circuitry 80 such as digital subtraction circuitry, and average generation circuitry 88. In some examples, average generation circuitry 88 may be implemented separately or as part of analog-to-digital conversion circuitry 78 and/or digital correlated double sampling circuitry 80.

Amplifier circuit 70 may include any suitable type of analog amplifier circuit. As an example, amplifier 70 may include an operational amplifier having an input capacitor coupling a first input terminal of the operational amplifier to column line 32 and having a second input terminal coupled to a reference voltage terminal and an output terminal coupled to sample-and-hold circuitry 72. The first input terminal of the operational amplifier may be coupled to the output terminal of the operational amplifier via a feedback capacitor and an autozero switch. The ratio of capacitances for the input and feedback capacitors may at least in part determine the gain characteristics of amplifier circuit 70.

Configured in this manner (or in other amplifier circuit configurations), amplifier circuit 70 may be configured to perform a correlated double sampling readout operation in the analog domain using reset and image level signals received from the same active pixel. In other words, the image level signal may be read out using correlated double sampling using the reset level signal as a reference or calibration signal. Sample-and-hold circuitry 72 may be configured to store both the reset level signal, such as Rcalib analog signal value 74, and the image level signal, such as S+Rcalib analog signal value 76, resulting from the analog correlated double sampling readout. "S+Rcalib" refers to the incorporation of reset level signal ("Rcalib") information into the image level signal ("S") performed as part of CDS and does not necessary refer to a simple addition of the "S" and "Rcalib" signals or voltages.

Further in the readout operation for an active pixel, both the reset level signal and the image level signal, or more specifically the correlated double sampled image level signal, may be converted from an analog voltage value to a digital value, or a digital number, by an analog-to-digital converter (ADC) such that a further digital-domain correlated double sampling operation may take place using the digital reset level value and the digital image level value. However, performing analog-to-digital conversion operations for the reset level signal and the image level signal for each active pixel may consume excessive time, thereby undesirably lowering the frame rate for the image sensor. Performing analog-to-digital conversion operations for the reset level signal and the image level signal may sometimes be referred to herein as performing the digitization of the reset level signal and the image level signal.

To increase the frame rate, at least some analog-to-digital conversions of the reset level signals for active pixels may be omitted. In some illustrative configurations, all of the analog-to-digital conversions of the reset level signals for active pixels may be omitted. In the example of FIG. 4, analog-to-digital converter 78 may convert the analog image level value resulting from the analog correlated double sampling operation, such as analog value 76, to a digital image level value, such as digital value 86 or a digital version of S+Rcalib analog signal value 76.

In scenarios where the corresponding pixel-specific reset level signal for the same pixel is not digitized, digital correlated double sampling circuitry 80 may use a digital average reset level value such as digital value 84 to perform the digital-domain correlated double sampling operation such as a subtraction operation for the digital image level value 86. In other words, the same digital average reset level value (instead of corresponding pixel-specific digital reset level values) may be used for digital-domain CDS of multiple digital image level values for multiple active pixels. As an example, digital CDS circuitry 80 may include subtraction circuits or other arithmetic or combinational logic circuits that generate a difference between digital value 84 and digital value 86 to perform the digital CDS operation.

Digital CDS circuitry 80, after performing the digital-domain correlated double sampling operation on the digital image level value 86 for each corresponding active pixel based on the digital average reset level value 84, may subsequently output the corresponding digital image value(s). The corresponding digital image value(s) may be used for further processing and/or to construct of an image frame.

As shown in FIG. 4, average generation circuitry 88 may generate one or more digital average reset level values 84. In some examples, digital average reset level value(s) 84 may be or include a same digital average reset level value for image data from multiple pixel rows, a same digital average reset level value for image data from the entire frame, and/or a same digital average reset level value for multiple frames. Configurations in which average generation circuitry 88 generate a periodically updated or rolling average are sometimes described herein as an illustrative example. In this example, value 84 may be updated for each rolling time window such as for one or more frame times or for a desired number of rows times. Average generation circuitry 88 may, if desired, include memory 90 such as digital memory configured to store multiple reset level digital values to be averaged and/or configured to maintain a current average reset level value 84 to be updated periodically. As an example, value 84 stored on memory 90 may be a rolling average that is updated as new reset level digital value(s) are incorporated and/or as older digital value(s) are discarded from the average. Average generation circuitry 88 may include digital arithmetic circuits, combinational logic circuits, and/or other circuits configured to generate a digital average reset level value from multiple digital reset level values or generally perform a digital averaging operation. If desired, average generation circuitry 88 may be implemented from part of another portion of per-column readout circuitry such as from a part of ADC 78 and/or a part of digital CDS circuitry 80.

Figure 5:
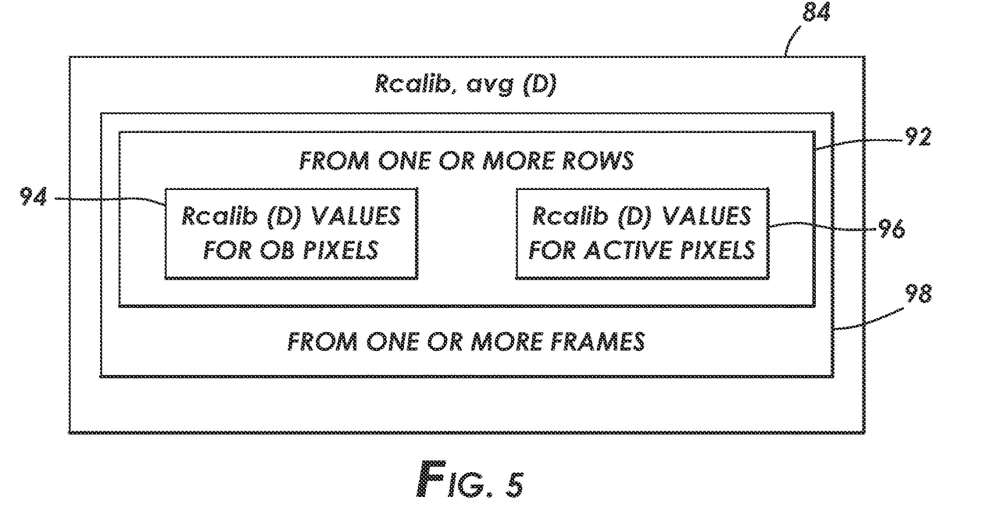
FIG. 5 is a diagram of illustrative information used to generate a digital average reset level value in accordance with some embodiments.

Average generation circuitry 88 may generate each digital average reset level value 84 using any suitable set of digital reset level values. FIG. 5 is a diagram of illustrative information such as types of digital reset level values that may be averaged to generate digital average reset level value 84.

In the example of FIG. 5, digital average reset level value 84 may incorporate, or more specifically be an average of, one or more digital reset level values 94 from optically black pixels and/or one or more digital reset level values 96 from active pixels. These digital reset level values 94 and/or 96 may be generated as part of readout operations for corresponding pixels rows 92. In some examples, pixel rows 92 may include one or more optically black pixel rows and/or one or more active pixel rows. If desired, these digital reset values 94 and/or 96 may be generated as part of readout operations for the same or different pixel rows 92 across one or more frames 98. In other words, digital reset values 94 and/or 96 may be based on the readout of reset level signals from the same pixel row(s) across different frames, based on the readout of reset level signals from different pixel rows across the same frame, and/or based on the readout of reset level signals from different pixel rows across different pixel frames.

A few illustrative examples are described below in connection with FIG. 4.

As one example, pixel 22-1 may be an optically black pixel in a first pixel row containing other optically black pixels, pixel 22-2 may be another optically black pixel in a second pixel row containing other optically black pixels, pixel 22-3 may be an active pixel in a third pixel row containing other active pixels, and pixel 22-4 may be an active pixel in a fourth pixel row containing other active pixels. In particular, an optically block pixel may be a pixel with the same or similar pixel configuration as an active pixel but optically shielded to not receive any incident light. In this example, the per-column readout circuitry in FIG. 4, which includes amplifier 70, sample-and-hold circuitry 72, and ADC 78, may readout and digitize the reset level signal from optically black pixel 22-1 to generate a first digital reset level value and may subsequently readout and digital the reset level signal from optically black pixel 22-2 to generate a second digital reset level value. Average generation circuitry 88 may store, at memory circuitry 90, and/or use or more specifically average these two digital reset level values to generate a digital average reset level value 84 stored at memory circuitry 90.

This generated digital average reset level value 84 may subsequently be accessed in memory 90 and used for digital correlated double sampling operations for multiple active pixels such as for all active pixels in the same column 23 or more specifically for pixels 22-3 and 22-4. In other words, following the readout and digitization of the first and second digital reset level values from optically black pixels 22-1 and 22-2, the per-column readout circuitry of FIG. 4 may perform analog-domain CDS on and digitize an image level signal from pixel 22-3 to generate a first digital image level value 86. Digital CDS circuitry 80 may perform digital-domain CDS for this digital image level value 86 using the digital average reset level value 84 as the reference or calibration value. As an example, digital CDS circuitry 80 may subtract this digital image level value 86 from the digital average reset level value 84 to generate output image data for pixel 22-3. Following the readout and digitization of the image level signal from pixel 22-3, the per-column readout circuitry of FIG. 4 may perform analog-domain CDS on and digitize an image level signal from pixel 22-4 to generate a second digital image level value 86. Digital CDS circuitry 80 may perform digital-domain CDS for this digital image level value 86 using the same digital average reset level value 84 as the reference or calibration value. As an example, Digital CDS circuitry 80 may subtract this digital image level value 86 from the same digital average reset level value 84 to generate output image data for pixel 22-4. In a similar manner, digital CDS circuitry 80 may perform digital-domain CDS on digital image data from any remaining active pixels in column 23 based on the same shared digital average reset level value 84 based on reset level signals from pixels 22-1 and 22-2.

The use of reset level signals from two optically black pixels 22-1 and 22-2 to generate the shared digital average reset level value is merely illustrative. If desired, column 23 may containing more than two optically black pixel rows, or generally any suitable number of optically black pixel rows, which provide the reset level signals based on which the shared digital average reset level value is generated.

If desired, the reset level signals based on which the shared digital average reset level value is generated need not be from exclusively optically black pixels but may instead or additionally be from active pixels. In particular, as another example, pixels 22-1, 22-2, 22-3, and 22-4 may all be active pixels. Reset level signals from active pixels 22-1 and 22-2 may be readout and digitized (along with corresponding image level signals from active pixels 22-1 and 22-2). The reset level signals from active pixels 22-1 and 22-2 may be used, or more specifically averaged, to generate digital average reset level value 84. While ADC circuitry 78 may perform two conversion operations for each of pixels 22-1 and 22-2, ADC circuitry 78 may only need to perform a single conversion operation for each of pixels 22-3 and 22-4, and any other pixels in column 23 because the digital-domain correlated double sampling of the digitized image values from these pixels 22-3, 22-4, etc. can make use of the digital average reset level value 84 generated based on the reset level signals from active pixels 22-1 and 22-2. While the averaging of two reset level signals from active pixels is described in this example, if desired, any suitable number of reset level signals from corresponding active pixels may be averaged to generate digital average reset level value 84.

If desired, the digital-domain correlated double sampling operation for image data for one frame may make use of digital reset level values obtained from one or more previous frames.

While FIG. 4 shows a single column 23 of pixels 22 being coupled to the column readout circuitry of FIG. 4, which contains amplifier 70, sample-and-hold circuitry 72, analog-to-digital converter 78, digital correlated double sampling circuitry 80, and average generation circuitry 88, this is merely illustrative. If desired, multiple columns of pixels 22 may share one or more of these components of the same per-column readout circuitry shown in FIG. 4. As an example, multiple columns of pixels 22 may be coupled to the same per-column readout circuitry via a shared output path 32 or corresponding separate output paths 32. In other words, multiple columns of pixels 22 may share the same readout path and/or share the same readout circuitry.

In these configurations, the digital reset level values 94 and/or 96 (FIG. 5) may be generated as part of readout operations for corresponding pixels rows 92 in multiple pixel columns and/or across one or more frames 98, as desired. In other words, a digital average reset level value 84 may be obtained by average generation circuitry 88 based on digital reset level values from multiple columns of pixels 22 that are subsequently averaged together. In particular, the multiple digital reset level values from multiple pixel columns may be read out, stored at memory 90, and/or processed to generate each digital average reset level value 84. If desired, respective analog reset level signals from different pixel columns may be combined or effectively averaged on a shared output path 32 and a combined signal representative of reset level signals from multiple pixel columns may be received and processed by the column readout circuitry. The digital average reset level value 84 may be used to perform digital correlated double sampling for digital image level values 86 obtained from active pixels 22 in the multiple columns. If desired, a digital average reset level value 84 obtained from reset level signals from pixels of one or more pixel columns may also be used to perform digital correlated double sampling for image level signals from pixels in other pixel columns different from those from which the reset level signals are obtained.

Figure 6:
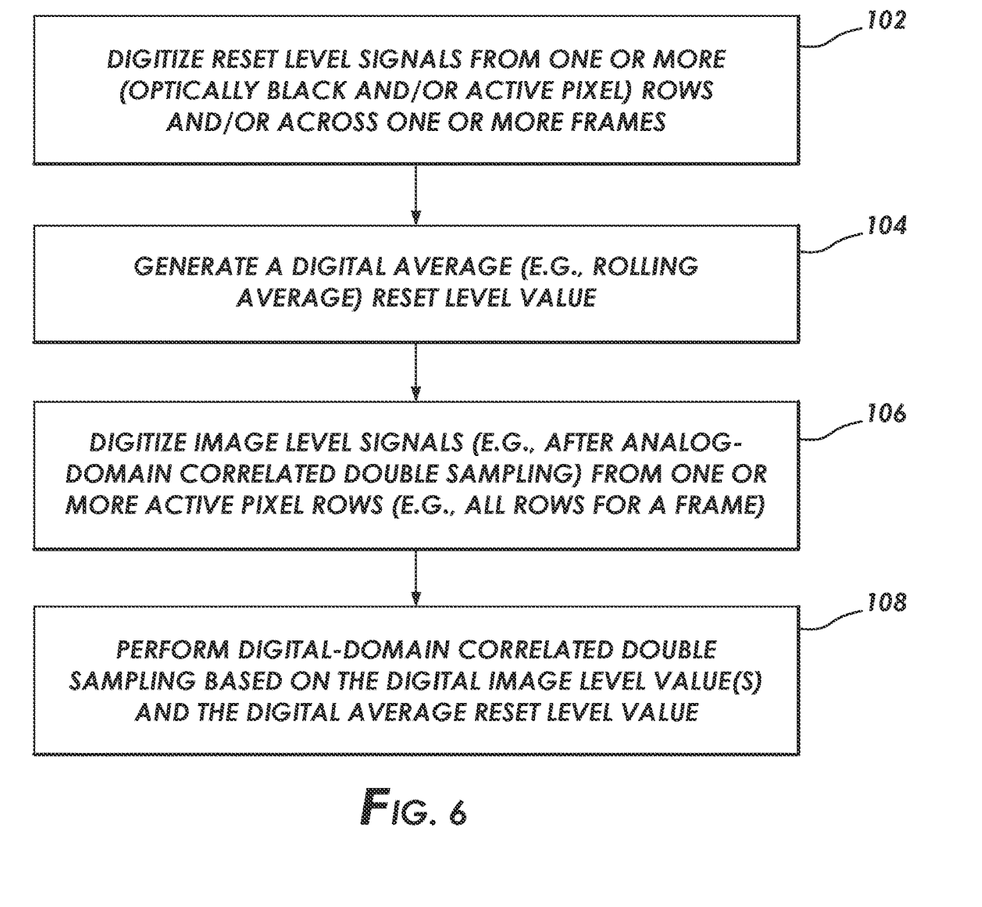
FIG. 6 is a flowchart of illustrative operations for performing correlated double sampling using an average reset level value in accordance with some embodiments.

FIG. 6 is a flowchart of illustrative operations for performing digital-domain CDS operations for one or more digital image level values using a digital average reset level value.

At block 102, readout circuitry such as the per-column readout circuitry of FIG. 4 may read out reset level signals from one or more pixel rows and/or across one or more image frames. In particular, ADC circuitry in the readout circuitry such as ADC 78 of FIG. 4 may digitize the analog reset level signals from corresponding pixels in corresponding pixel rows across one or more frames to generate respective digital reset level values.

At block 104, the readout circuitry such as average generation circuitry 88 of FIG. 4 may generate a digital average reset level value from or more specifically by averaging the respective digital reset level values obtained at block 102. If desired, the digital average reset level value may be a periodically updated digital average reset level values based on a rolling time window have a duration equal to one or more frame times and/or one or more row times.

At block 106, the readout circuitry such as the per-column readout circuitry of FIG. 4 may read out image level signals from one or more active pixel rows. These one or more active pixel rows may be all rows from which an image frame is generated. In particular, amplifier circuitry such as amplifier circuitry 70 of FIG. 4 may generate, based on analog-domain correlated double sampling using analog reset level values, analog image level values, which are subsequently digitized by the ADC circuitry to produce digital image level values.

At block 108, correlated double sampling circuitry such as CDS circuitry 80 of FIG. 4 may perform digital-domain correlated double sampling based on the digital image values obtained at block 106 and the digital average reset level value obtained at block 104.

While blocks 102 and 104 are shown to occur prior to blocks 106 and 108, this is merely illustrative. In particular, operations at blocks 102 and 104 may at least partly overlap temporally with the operations at blocks 106 and 108, if desired. In other words, the set of reset level signals used to maintain an up-to-date digital average reset level value may be obtained at any suitable time. For example, some of the set of reset level signals from active and/or optically black pixels may be obtained prior to the current frame being readout, some of the set of reset level signals may be obtained from optically black and/or active pixels at the beginning of the current frame being readout, and/or some of the set of reset level signals may be obtained as part of readout operations of active pixels. In particular, these readout operations that include digitization of both image level and reset level signals of the active pixels. In a similar manner, the digital average reset level value can be generated and/or updated at any suitable time. In particular, the digital average reset level value can be generated and/or updated as new digital reset values are obtained, based on a new frame being readout, and/or to accommodate any other desired operations of the image sensor.

Various embodiments have been described illustrating the use of a digital average reset level value to perform digital-domain correlated double sampling in readout circuitry of image sensors.

As a first example, an image sensor may include an image sensor pixel array containing a column of image sensor pixels and may include per-column readout circuitry coupled to the column of image sensor pixels via a column line. The per-column readout circuitry may be configured to maintain an average reset level value based on multiple reset level values, and perform a correlated double sampling operation on an image level value using the average reset level value. The per-column readout circuitry may be configured to perform an additional correlated double sampling operation on an additional image level value using the average reset level value. The image level value may be based on a first image level signal from a first image sensor pixel in the column of image sensor pixels and the additional image level value may be based on a second image level signal from a second image sensor pixel in the column of image sensor pixels. The average reset level value may be a digital average reset level value and the image level value may be a digital image level value. The per-column readout circuitry may include an average generation circuitry configured to obtain the multiple reset level values and to generate the digital average reset level value and may include digital-domain correlated double sampling operation configured to perform the correlated double sampling operation at least in part by performing a subtraction operation using the digital image level value and the digital average reset level value.

If desired, the multiple reset level values may be based on reset level signals from corresponding optically black pixels in the column of image sensor pixels. If desired, the multiple reset level values may be based on reset level signals from corresponding active pixels in the column of image sensor pixels. If desired, the image level value may be based on an image level signal used to generate an image frame and the multiple reset level values may be based on reset level signals for an additional image frame prior to the image frame.

If desired, the image level value may be based on an image level signal used to generate an image frame and the multiple reset level values may be based on reset level signals for the image frame.

As a second example, a method of performing digital-domain correlated double sampling readout may include obtaining a plurality of reset level signals from multiple image sensor pixels, generating a digital average reset level value based on the plurality of reset level signals, and performing a digital-domain correlated double sampling operation on a digital image level value using the digital average reset level value as a reference value. If desired, the method may further include updating the digital average reset level value based on one or more new reset level signals. If desired, the one or more new reset level signals may be obtained as part of a same image frame for which the plurality of reset level signals are obtained. If desired, the one or more new reset level signals may be obtained as part of a different image frame than an image frame for which the plurality of reset level signals are obtained. If desired, the digital average reset level value may include a rolling average across a rolling time window.

If desired, the multiple image sensor pixels may include a plurality of optically black pixels, the digital image level value may be based on an image level signal from an active pixel, and the plurality of optically black pixels and the active pixel may be in a same pixel column of an array.

If desired, the digital image level value may be usable to generate an image frame and the plurality of reset level signals may be obtained during a readout operation for the image frame. In particular, the readout operation for the image frame may include a plurality of pixel row readout operations. A first set of the pixel row readout operations may occur prior to a second set of the pixel row readout operations. The plurality of reset level signals may be obtained during the first set of the pixel row readout operations and the digital image level value may be based on an image level signal obtained during the second set of pixel row readout operations.

As a third example, an image sensor may include a set of image sensor pixels, a shared output path, and column readout circuitry coupled to each image sensor pixel in the set via the shared output path. The column readout circuitry may include amplifier circuitry configured to perform an analog-domain correlated double sampling operation, digital correlated double sampling circuitry configured to perform a digital-domain correlated double sampling operation, an analog-to-digital converter coupled between the amplifier circuitry and the digital correlated double sampling circuitry, and average generation circuitry configured to generate a digital average reset level value based on which the digital correlated double sampling circuitry is configured to perform the digital-domain correlated double sampling operation.

If desired, the set of image sensor pixels may include a plurality of active pixels that output corresponding analog reset level signals and the analog-to-digital converter may omit one or more conversion operations for at least some of the analog reset level signals.

If desired, the set of image sensor pixels may include a plurality of optically black pixels that output corresponding analog reset level signals, the analog-to-digital converter may perform conversion operations for at least some of the analog reset level signals, and the average generation circuitry may be configured to generate the digital average reset level value based on the at least some of the analog reset level signals.

It will be recognized by one skilled in the art that the present exemplary embodiments may be practiced without some or all of these specific details. In other instances, well-known operations have not been described in detail in order not to unnecessarily obscure the present embodiments.

The foregoing is merely illustrative and various modifications can be made to the described embodiments. The foregoing embodiments may be implemented individually or in any combination.

What is claimed is:

1. An image sensor comprising:
   an image sensor pixel array including a plurality of columns of image sensor pixels; and
   per-column readout circuitry coupled to a given column of the plurality of columns of image sensor pixels via a column line, wherein the per-column readout circuitry is configured to:
   maintain an average reset level value based on multiple reset level values, and
   perform a correlated double sampling operation on an image level value using the average reset level value.

2. The image sensor defined in claim 1, wherein the per-column readout circuitry is configured to perform an additional correlated double sampling operation on an additional image level value using the average reset level value.

3. The image sensor defined in claim 2, wherein the image level value is based on a first image level signal from a first image sensor pixel in the given column of image sensor pixels and wherein the additional image level value is based on a second image level signal from a second image sensor pixel in the given column of image sensor pixels.

4. The image sensor defined in claim 1, wherein the multiple reset level values are based on reset level signals from corresponding optically black pixels in the given column of image sensor pixels.

5. The image sensor defined in claim 1, wherein the multiple reset level values are based on reset level signals from corresponding active pixels in the given column of image sensor pixels.

6. The image sensor defined in claim 1, wherein the image level value is based on an image level signal used to generate an image frame and wherein the multiple reset level values are based on reset level signals for an additional image frame prior to the image frame.

7. The image sensor defined in claim 1, wherein the image level value is based on an image level signal used to generate an image frame and wherein the multiple reset level values are based on reset level signals for the image frame.

8. The image sensor defined in claim 1, wherein the average reset level value comprises a digital average reset level value, wherein the per-column readout circuitry comprises an average generation circuitry configured to obtain the multiple reset level values and to generate the digital average reset level value.

9. The image sensor defined in claim 8, wherein the image level value comprises a digital image level value and wherein the per-column readout circuitry comprises digital-domain correlated double sampling circuitry configured to perform the correlated double sampling operation at least in part by performing a subtraction operation using the digital image level value and the digital average reset level value.

10. A method of performing digital-domain correlated double sampling readout, the method comprising:
    obtaining, by per-column readout circuitry, a plurality of reset level signals from multiple image sensor pixels;
    generating, by the per-column readout circuitry, a digital average reset level value based on the plurality of reset level signals; and
    performing, by the per-column readout circuitry, a digital-domain correlated double sampling operation on a digital image level value using the digital average reset level value as a reference value.

11. The method defined in claim 10, wherein the multiple image sensor pixels comprise a plurality of optically black pixels, wherein the digital image level value is based on an image level signal from an active pixel, and wherein the plurality of optically black pixels and the active pixel are in a same pixel column of an array.

12. The method defined in claim 10, wherein the digital image level value is usable to generate an image frame and wherein the plurality of reset level signals are obtained during a readout operation for the image frame.

13. The method defined in claim 12, wherein the readout operation for the image frame comprises a plurality of pixel row readout operations, wherein a first set of the pixel row readout operations occur prior to a second set of the pixel row readout operations, wherein the plurality of reset level signals are obtained during the first set of the pixel row readout operations, and wherein the digital image level value is based on an image level signal obtained during the second set of pixel row readout operations.

14. The method defined in claim 10, further comprising:
    updating the digital average reset level value based on one or more new reset level signals.

15. The method defined in claim 14, wherein the one or more new reset level signals are obtained as part of a same image frame for which the plurality of reset level signals is obtained.

16. The method defined in claim 14, wherein the one or more new reset level signals are obtained as part of a first image frame different from a second image frame for which the plurality of reset level signals is obtained.

17. The method defined in claim 14, wherein the digital average reset level value comprises a rolling average across a rolling time window.

18. An image sensor comprising:
    a set of image sensor pixels;
    a shared output path; and
    column readout circuitry coupled to each image sensor pixel in the set via the shared output path, wherein the column readout circuitry comprises:
        amplifier circuitry configured to perform an analog-domain correlated double sampling operation;
        digital correlated double sampling circuitry configured to perform a digital-domain correlated double sampling operation;
        an analog-to-digital converter coupled between the amplifier circuitry and the digital correlated double sampling circuitry; and
        average generation circuitry configured to generate a digital average reset level value based on which the digital correlated double sampling circuitry is configured to perform the digital-domain correlated double sampling operation.

19. The image sensor defined in claim 18, wherein the set of image sensor pixels comprises a plurality of active pixels that output corresponding analog reset level signals and wherein the analog-to-digital converter omits one or more conversion operations for at least some of the analog reset level signals.

20. The image sensor defined in claim 18, wherein the set of image sensor pixels comprises a plurality of optically black pixels that output corresponding analog reset level signals, wherein the analog-to-digital converter performs conversion operations for at least some of the analog reset level signals, and wherein the average generation circuitry is configured to generate the digital average reset level value based on the at least some of the analog reset level signals.

* * * * *